United States Patent
Bi et al.

(10) Patent No.: US 9,456,006 B2
(45) Date of Patent: Sep. 27, 2016

(54) METHOD, DEVICE AND SYSTEM FOR SESSION BINDING

(75) Inventors: Yifeng Bi, Shenzhen (CN); Guoyan Liu, Shenzhen (CN); Zaifeng Zong, Shenzhen (CN); Xiaoyun Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 283 days.

(21) Appl. No.: 14/234,740

(22) PCT Filed: Jun. 18, 2012

(86) PCT No.: PCT/CN2012/077080
§ 371 (c)(1),
(2), (4) Date: Jan. 24, 2014

(87) PCT Pub. No.: WO2013/013541
PCT Pub. Date: Jan. 31, 2013

(65) Prior Publication Data
US 2014/0164633 A1 Jun. 12, 2014

(30) Foreign Application Priority Data

Jul. 26, 2011 (CN) .......................... 2011 1 0210986
Sep. 30, 2011 (CN) .......................... 2011 1 0308927

(51) Int. Cl.
*H04L 29/12* (2006.01)
*H04L 29/06* (2006.01)
*H04L 29/08* (2006.01)

(52) U.S. Cl.
CPC ....... *H04L 65/1066* (2013.01); *H04L 65/1069* (2013.01); *H04L 67/14* (2013.01); *H04L 61/103* (2013.01); *H04L 61/2007* (2013.01); *H04L 61/2514* (2013.01); *H04L 61/2517* (2013.01)

(58) Field of Classification Search
CPC .......... H04L 12/1403; H04L 12/5695; H04L 47/41; H04L 63/08; H04L 65/1046; H04L 65/1066; H04L 65/1069; H04L 67/14; H04L 61/2514; H04L 61/2517; H04W 4/20; H04W 8/26
See application file for complete search history.

(56) References Cited

U.S. PATENT DOCUMENTS

2008/0232376 A1* 9/2008 Huang .................... H04W 4/20
370/395.3
2009/0016344 A1* 1/2009 Hu ......................... H04L 47/41
370/389

(Continued)

FOREIGN PATENT DOCUMENTS

CN 1874328 12/2006
CN 1993947 7/2007

(Continued)

OTHER PUBLICATIONS

International Search Report for corresponding application PCT/CN2012/077080 filed Jun. 18, 2012; mail date Oct. 4, 2012.

(Continued)

*Primary Examiner* — Le H Luu
(74) *Attorney, Agent, or Firm* — Cantor Colburn LLP

(57) ABSTRACT

Disclosed are a method, device and system for session binding. The method includes: a PCRF or BPCF receives a first session from a fixed network, wherein the first session carries an IP address and a port number set; the PCRF or BPCF receives a second session from an AF or a Traffic Detection Function (TDF), wherein the second session carries an IP address and port number information; and the PCRF or BPCF binds the first session to the second session according to the IP addresses and the port number information. The disclosure solves the problem of inaccurate session binding in the scenario where a mobile terminal directly accesses mobile network services via a fixed network.

11 Claims, 6 Drawing Sheets

(56) References Cited

U.S. PATENT DOCUMENTS

| | | | |
|---|---|---|---|
| 2009/0207757 A1* | 8/2009 | Andreasen | H04L 12/1403 370/254 |
| 2010/0311392 A1* | 12/2010 | Stenfelt | H04L 63/08 455/411 |
| 2012/0072592 A1* | 3/2012 | Lidstrom | H04L 12/5695 709/224 |
| 2012/0314632 A1* | 12/2012 | Martinez De La Cruz | H04L 65/1046 370/310 |
| 2014/0269740 A1* | 9/2014 | Garneij | H04W 8/26 370/401 |

FOREIGN PATENT DOCUMENTS

| | | |
|---|---|---|
| CN | 101720108 | 6/2010 |
| WO | 2010099876 A1 | 9/2010 |

OTHER PUBLICATIONS

3GPP: "3rd Generation Partnership Project; Technical Specification Group Services and System Aspects; Study on Support of BBF Access Interworking (Release 11)", 3GPP Mobile Competence Centre, Apr. 6, 2011, XP050631560.

Ericsson et al: "New normative Annex: Fixed Broadband access interworking", 3GPP Mobile Competence Centre, May 11, 2011, XP050525493.

European Search Report for corresponding application EP 12 81 7624; Report dated Jan. 29, 2015.

Maurice Pope et al: "Draft Report of 3GPP-BBF Workshop", 3GPP Mobile Competence Centre, Nov. 11, 2011 XP050579628.

* cited by examiner

METHOD, DEVICE AND SYSTEM FOR SESSION BINDING

TECHNICAL FIELD

The disclosure relates to the communication field, and in particular to a method, device and system for session Binding.

BACKGROUND

The Evolved Packet System (EPS) of the 3rd Generation Partnership Project (3GPP) consists of an Evolved Universal Terrestrial Radio Access Network (E-UTRAN), a Mobility Management Entity (MME), a Serving Gateway (S-GW), and a Packet Data Network Gateway (P-GW) and a Home Subscriber Server (HSS).

The EPS supports interworking with a non-3GPP system (as shown in FIG. 1), wherein the interworking with the non-3GPP system is realized via an S2a/b/c interface, and the P-GW is taken as an anchor point between the 3GPP and the non-3GPP systems. In a system architecture diagram of the EPS, the non-3GPP system access is divided into untrusted non-3GPP access and trusted non-3GPP access; the untrusted non-3GPP access should be connected with the P-GW via an Evolved Packet Data Gateway (ePDG), and the interface between the ePDG and the P-GW is S2b; the trusted non-3GPP access can be connected with the P-GW directly via S2a interface, and the S2a interface uses Proxy Mobile IP version 6 (PMIPv6) to perform information exchange; in addition, the S2c interface has provided user-panel relevant control and mobility support between a user equipment (UE) and the P-GW, and the mobility management protocol supported thereby is Mobile IPv6 Support for Dual Stack Hosts and Routers (DSMIPv6), and it can be used for untrusted non-3GPP and trusted non-3GPP access.

The Wireless Local Area Network (WLAN) can access the EPS as a non-3GPP system, and this relates to the problem of an interconnection and interworking of the Fixed Mobile Convergence (FMC) concerned by many operators. The technique of interconnection and interworking and address allocation is as follows:

in the prior art, when the Residential Gateway (RG) is in a routing mode and supports that when Network Address (Port) Translation (NA(P)T) is N:1 (N is greater than or equal to 1), the RG can obtain the International Mobile Subscriber Identity (IMSI) or Network Access Identity (NAI) as the authentication party during performing an authentication based 3GPP Extensible Authentication Protocol (EAP). When establishing an NA(P)T entrance table, as shown in FIG. 2, the RG will establish an IMSI and a port number set (no port number will be allocated when N equals 1), and an association relationship of local IP addresses (abbreviated as: user identity association table), wherein the port number set (no port number is allocated when N equals 1) and the local IP addresses have been performed NA(P)T conversion by the RG Moreover, the RG also supports transferring the user identity association table to the Broadband Network Gateway/Broadband Remote Access Server (BNG/BRAS) via a Radius message. When the RG is in a bridge mode, the BNG/BRAS can obtain the IMSI/NAI during executing the authentication of EAP based 3GPP as an authenticator. In general, when the BNG/BRAS allocates a public network address to the mobile terminal as a public IP address, the BNG/BRAS establishes an association relationship between the IMSI/NAI and the local IP address, without containing the port number set; otherwise, the BNG/BRAS needs to support NA(P)T, and the association relationship should contain the port number set (as shown in FIG. 2).

In summary, in the scenario where the terminal access the EPC (Evolved Packet Core) via WLAN, if the RG is taken as a NA(P)T, especially in the scenario of N:1, the IP address acquired by the terminal is a private address allocated by the RG, and what is in communication with the exterior is the public address which has been converted by the RG, in addition to the port number. Since the terminal may have different services, and different services occupy different port numbers, that is, when a terminal has a plurality of services at the same time, what identifies the terminal is a public IP address in addition to a port number set. When another terminal accesses the RG, the address converted by the RG is also the IP public address, but the sets of the port numbers thereof are different. The public address and port number set will be reported to the BNG/BRAS/AAA.

The service offload technique is as follows: the terminal introduced in above-mentioned interconnection and interworking part has a plurality of services at the same time which comprise the service being offloaded from the WLAN and the service being routed via the EPC. The case of the service being offloaded by the WLAN and the service being routed via the EPC are as follows: because of the diversity service requirements of user, the user accesses a plurality of services at the same time; if all the services pass through the core network of 3GPP, which not only increases the data traffic load of the core network but also results in that the plurality of services preempt limited network resources, the quality of the service which has high requirement for the QoS cannot be guaranteed. Therefore, it is necessary to effectively implement the service offload. Taking S2b as an example, as shown in FIG. 3, for the operators, a portion of services can be transmitted via the EPS, and the other portion of services (for example: Internet service, the service on the stream media service platform of the mobile network is also included) can be offloaded by the WLAN, according to the features of the services, so that the traffic load of the 3GPP core network is reduced.

Different services be offloaded by the WLAN occupy a plurality of different port numbers in the above-mentioned port number set, as all being in an IPsec tunnel package, data packets routed by the EPC will occupy one port number in the port number set.

The policy control technique is as follows: with the trend of the FMC architecture being deeply converged, when the mobile terminal directly implements service offload via a WLAN, the PCRF server of the 3GPP network will still issue a particular policy control or charging rules related with the mobile terminal to a fixed network. For example, a policy control or charging and so on is performed according to a particular service type of a certain mobile terminal; after receiving the policy rules of the policy control server or the charging rules of the charging server, the network element of the fixed network will carry out collection of policy control or charging information related with the particular mobile terminal.

In order to support issuing the policy related with the particular mobile terminal to the BNG/BRAS, a policy session is established by the Broadband Policy Control Function (BPCF), the BPCF establishes a session with the PCRF of 3GPP, acquires the policy from the PCRF, and issues the policy to the BNG/BRAS.

In the case where the service offloaded by WLAN is from a stream media service platform of a mobile network, in the relevant art, when the Application Function (AF) receives a service establishment request from a mobile terminal, or when a Traffic Detection Function (TDF) detects service information, interaction with the PCRF will be performed to request the PCRF for a policy whether the service is accepted.

However, if it is desirable to perform user-level management and control on data directly routing from the BNG/BRAS to the Internet/PDN, the BPCF needs to be able to download a user-based policy from the PCRF and to be able to report user-based information to the PCRF; moreover, the PCRF establishes an Rx session/AF session with the AF (or the PCRF establishes an Sd session/TDF session with the TDF), and the PCRF establishes an S9* session with the fixed network; and the PCRF needs to be able to perform an user-level session binding before transmitting the policy (same demand exists for the scenarios of a BPCF binding AF session/Rx session (or Sd session/TDF session) to a fixed network policy session). The above-mentioned S9* session can also be called S9a session, and an S9* interface is also called S9a interface; and the S9a session refers to a gateway control session or an IP-CAN session, or refers to both at the same time, on the S9a interface.

Referring to the association mechanism, shown in FIG. 4, between the AF session/Rx session (or Sd session/TDF session) and an S9* session, traditional methods for session binding by the policy control and charging technique are: session binding according to IP address management, or session binding according to an user identity (for example, IMSI or NAI), or session binding according to a PDN identification (for example, APN). But herein, the information mentioned above is not enough, because there is neither user identity nor APN information on the Rx/Sd. Although there is IP address information, the IP address of the terminal is public, and is a public address using by a plurality of UEs accessed to the same RG (see the above-mentioned analysis). Therefore, session binding purely according to the addresses will lead to mistakes.

It can be seen from the above-mentioned analysis that, for the scenario where the mobile terminal accesses a mobile network service directly via a fixed network, a problem of inaccurate session binding exists in the above-mentioned method for session binding; and aiming at the problem of inaccurate session binding exists in the scenario where a mobile terminal accesses a mobile network service directly via a fixed network in the relevant art, no effective solution is proposed yet at present.

SUMMARY

The embodiment of the disclosure provides a method, device and system for session binding, so as to at least solve the mentioned-above problem of inaccurate session binding in the scenario where a mobile terminal accesses a mobile network service directly via a fixed network.

According to one aspect of the embodiment of the disclosure, a method for session binding is provided, and the method comprises: a PCRF or BPCF receiving a first session from a fixed network, wherein the first session carries an IP address and a port number set; the PCRF or BPCF receiving a second session from an Application Function (AF) or Traffic Detection Function (TDF), wherein the second session carries an IP address and port number information; and the PCRF or BPCF binding the first session to the second session according to the above-mentioned IP addresses and port number information.

The first session comprises one of the following: a message for trigging an S9* session, the S9* session, an S9 session or a fixed network policy session; and the second session is embodied as an Rx session or an AF session, or an Sd session, or a TDF session.

The PCRF or BPCF binding the first session to the second session according to the IP addresses and the port number information comprises: the PCRF or BPCF binding the first session to the second session when determining that the first session and second session satisfy the following two conditions: 1) the IP address of the first session and an the IP address of the second session are the same; and 2) a port number in the port number information of the second session is an element in a port number set of the first session.

After the PCRF or BPCF binds the first session to the second session, the method further comprises: the PCRF or BPCF making a policy for a service according to an association relationship between the first session and the second session, and issuing the policy.

The above-mentioned method further comprises: the PCRF or BPCF saving the IP address and port number set by means of a user identity association table.

The PCRF or BPCF receiving the first session from the fixed network comprises one of the following: when a terminal starts an initial access the fixed network, the fixed network initiating a first session establishment process, with the first session carrying the IP address and port number set initially allocated to the terminal by the fixed network; and when updating the IP address and/or port number set of the terminal, the fixed network initiating a first session modification process, with the first session carrying the modified IP address and/or port number set.

According to another aspect of the embodiment of the disclosure, a device for session binding is provided, which is provided on a PCRF or BPCF, and comprises: a first receiving module configured to receive a first session from a fixed network, wherein the first session carries an IP address and a port number set; a second receiving module configured to receive a second session from an AF or a TDF, wherein the second session carries an IP address and port number information; and an association module configured to bind the first session to the second session according to the IP addresses and port number information.

The association module comprises: a judgment unit configured to judge whether the IP address carried by the first session and the IP address carried by the second session are the same, and to judge whether a port number in the port number information carried by the second session is an element in the port number set carried by the first session; and an association unit configured to bind the first session to the second session when judgment results of the judgment unit are both yeses.

According to another aspect of the embodiment of the disclosure, a system for session binding is provided. The system comprises a PCRF or BPCF, wherein the mentioned-above device is provided on the PCRF or BPCF, and the system further comprises: a fixed network element configured to send the first session to the device; and an AF or TDF configured to send the second session to the device.

By means of the disclosure, sessions are bound by way of matching IP addresses and port numbers, so the problem of inaccurate session binding in the scenario where a mobile terminal directly accesses a mobile network service via a fixed network is solved; at the same time, the method does not add a new signalling, so that the method can be able to be compatible with existing protocols and is easily realizable, and the development cost is low.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The preferred embodiments are described in conjunction with the drawings as follows. It shall be noted that the embodiments of the present application and the features of the embodiments can be combined with each other if there is no conflict.

In order to accurately bind a plurality of services initiated by a user, the embodiment of the disclosure provides a method, device and system for session binding, applicable to a scenario where a mobile terminal directly accesses a mobile network service via a fixed network.

Clarification: in the disclosure, an Rx interface exists between the PCRF and AF, and the session established between the PCRF and the AF is referred to as an AF session or Rx session; and an Sd interface exists between the PCRF and TDF, and the session between the PCRF and the TDF is referred to as a TDF session or Sd session. In the disclosure, the AF session and the Rx session may be used in turn, and the TDF session and the Sd session can be used in turn, without affecting the essential contents of the disclosure.

Embodiment 1

Figure 5:
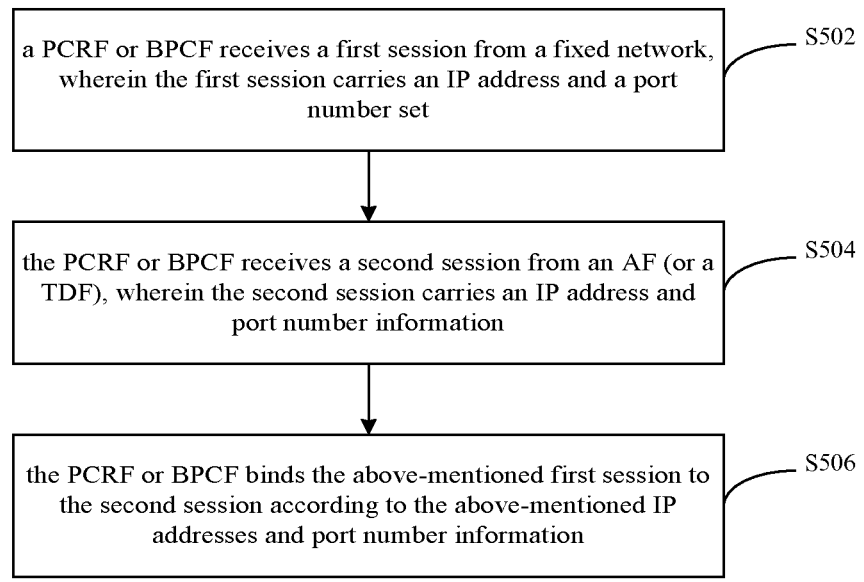
FIG. 5 is a flowchart of a method for session binding according to embodiment 1 of the disclosure.

A method for session binding is provided in this embodiment, referring to FIG. 5, the method comprises the following steps:

step S502, a PCRF or BPCF receives a first session from a fixed network, wherein the first session carries an IP address and a port number set.

The network elements in the fixed network comprise one of the following: an RG, a BNG, a BRAS, or an AAA server (which can also be called AAA for short);

step S504, the PCRF or BPCF receives a second session from an AF (or a TDF), wherein the second session carries an IP address and port number information.

The "port number information" in the above-mentioned second session may be an individual port number, and may also be a set of a group of port numbers. In order not to lead to confusion in expression with the "port number set" of the first session, it is referred to as port number information herein. However, it needs to be clear that the possibility of a port number set being carried in the second session. So do the following embodiment.

Step S506, the PCRF or BPCF binds the above-mentioned first session to the second session according to the above-mentioned IP addresses and port number information. For example, when the PCRF or BPCF determines to bind the first session to the second session when the first session and second session satisfies the following two conditions:

1) the IP address of the first session and the IP address of the second session are the same; and 2) an port number in the port number information of the second session is an element in the port number set of the first session.

That is, when the IP address carried by the first session is the same as the IP address carried by the second session, and the port number in the port number information carried in the second session is an element in the port number set carried in the first session, the PCRF or BPCF binds the first session to the second session. If the IP addresses in the two sessions are different, the two sessions will not be bound; and if only the IP addresses are the same, but the port number in the port number information carried in the second session is not an element in the port number set carried in the first session, the two sessions will not be bound either.

In the above-mentioned mechanism session binding according to the IP addresses and the port numbers, the order of checking the IP addresses and the port numbers can be changed, and does not have to be in accordance with the description above: the strict order of binding according to the IP addresses and then binding according to the port numbers thereafter. Only two conditions of session binding are listed above, which is not one after another in order; or even if it is one after another in order, the order will not affect the binding effect. So do the following embodiment.

In the above-mentioned step 504, in the second session, the mechanism for sending a port number to the PCRF or BPCF can be at least the following two ways: 1) the second session in the prior art has already carried traffic description information, with the traffic description information carrying the port number, the PCRF or BPCF can parse out the port number therefrom after receiving the traffic description information; and 2) in the second session, a new information element is enhanced, and a port number of a service is carried in the new information element and is sent to the PCRF or BPCF by the AF/TDF. So do the following embodiment.

The first session in this embodiment comprises one of the following: a message for triggering an S9* session, an S9* session, an S9 session or a fixed network policy session; and the second session is embodied as an Rx session or AF session, or, an Sd session or TDF session. The S9* session is also called S9a session, similarly hereinafter.

In this embodiment, sessions are bound by way of matching IP addresses and matching port numbers, the problem of inaccurate session binding in the scenario where a mobile terminal directly accesses a mobile network service via a fixed network is solved; at the same time, the method, in which an new signalling is not added, can be able to be compatible with existing protocols and is easily realizable, and the development cost is low. This kind of method for session binding is applicable to the cases where there is neither user identity nor APN information on the Rx/Sd, which can effectively avoid error session binding when IP addresses of a plurality of terminals are the same.

After the PCRF or BPCF binds the first session with the second session, the method further comprises: the PCRF or BPCF makes a policy for a service initiated by the user according to the association relationship between the first session and second session, and issues the policy.

The above-mentioned method further comprises: the PCRF or BPCF saves the IP address and port number set of the user by means of a user identity association table. Considering that the IP address and port number allocated to the user might change, the above-mentioned method further comprises: the PCRF or BPCF receives an update session from the fixed network, wherein the updated session carries the user-updated IP address and port number set; the PCRF or BPCF updates the IP address and port number set in the user identify association table of the user using the user-updated IP address and port number set.

It can be seen from the above-mentioned method that, taking the PCRF performing session binding as an example, the above-mentioned method can be simply described as follows:

1) a fixed network initiates a first session to the PCRF, and sends an IP address and at least one port number set to the PCRF;

2) the AF/TDF establishes a second session with the PCRF, and sends an IP address and port number to the PCRF; and 3) the PCRF binds the first session with the second session according to the IP addresses and port numbers; for example, when the IP addresses carried by the first session and the second session are the same, and the port number carried by the second session is an element in the port number set carried by the first session, the PCRF binds the first session with the second session;

the first session refers to an S9* session or an S9 session; and the second session refers to an Rx session or AF session, or, an Sd session or TDF session;

taking the BPCF performing session binding as an example, the above-mentioned method can be simply described as follows:

1) a BNG/BRAS/AAA initiates to establish a first session with the BPCF, and sends an IP address and a port number set to the BPCF;

2) AF/TDF establishes a second session with the BPCF, and sends an IP address and at least one port number to the BPCF; and 3) the BPCF binds the first session with the second session according to the IP addresses and the port number information;

the first session refers to a fixed network policy session initiated by the BNG/BRAS/AAA to the BPCF, or a message for triggering the BPCF to establish an S9* session;

for the scenario where a mobile terminal accesses a mobile network service directly via a fixed network, the binding mechanism of the PCRF can also comprise the following process:

1) the BNG/BRAS/AAA reports a local IP address, port number set and user identity of the terminal to the BPCF;

2) the BPCF reports the local IP address, port number set and user identity to the BPRF when establishing/modifying the S9* session;

3) an AF/TDF issues the "local address and port number" of the service to the PCRF when establishing an Rx/Sd session or issuing service information via an Rx/Sd interface; and 4) the PCRF carries out the following detection, and binds the S9* session/fixed network policy session to the Rx/Sd session if the following two are satisfied:

the local address sent from the AF/TDF is the same as the local address sent from the BNG/BRAS/AAA/BPCF; and the port number sent from the AF/TDF is an element in the port number set sent from the BNG/BRAS/AAA/BPCF;

The above-mentioned first session can be a first session initiated in one of the following scenarios:

1) when a terminal initially accesses the fixed network, the fixed network initiates a first session establishment process, with the first session carrying the IP address and port number set initially allocated to the terminal by the fixed network (corresponding to example 1 and example 2); and 2) when updating the IP address and/or port number set of the terminal, the fixed network initiates a first session modification process, with the first session carrying the modified IP address and/or port number set (corresponding to example 3).

EXAMPLE 1

Figure 1:
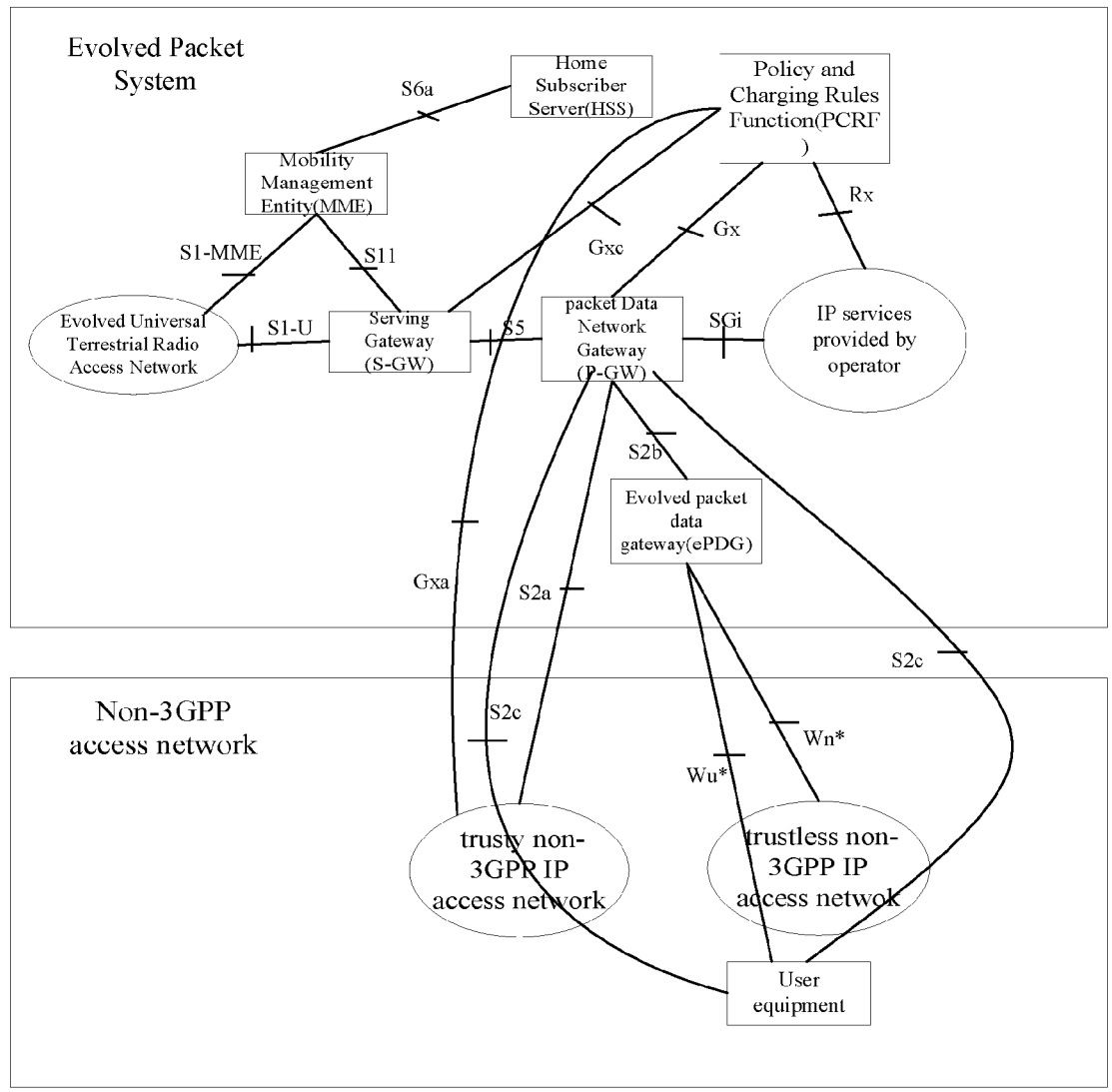
FIG. 1 is a network architectural diagram of a 3 GPP network interworking with a non-3 GPP network according to the relevant art.
Figure 2:
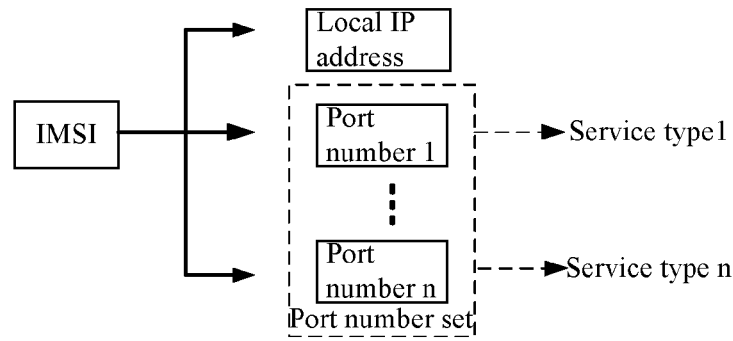
FIG. 2 is a schematic diagram of an association relationship between IP address with port number set which has been performed an NA(P)T in fixed network, and a mobile terminal, when the service offload is performed via a WLAN according to the relevant art.
Figure 3:
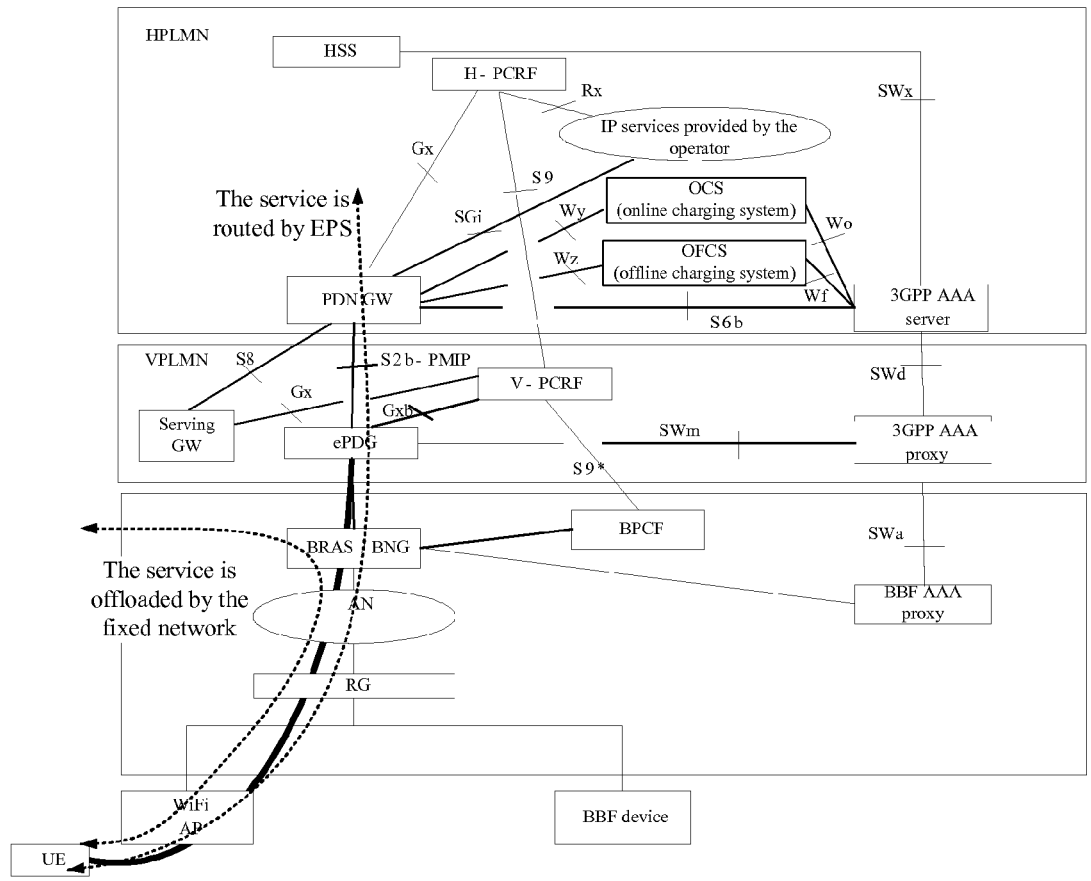
FIG. 3 is a network structural diagram of a mobile terminal performing service offload via a WLAN and accessing an EPC according to the relevant art.
Figure 4:
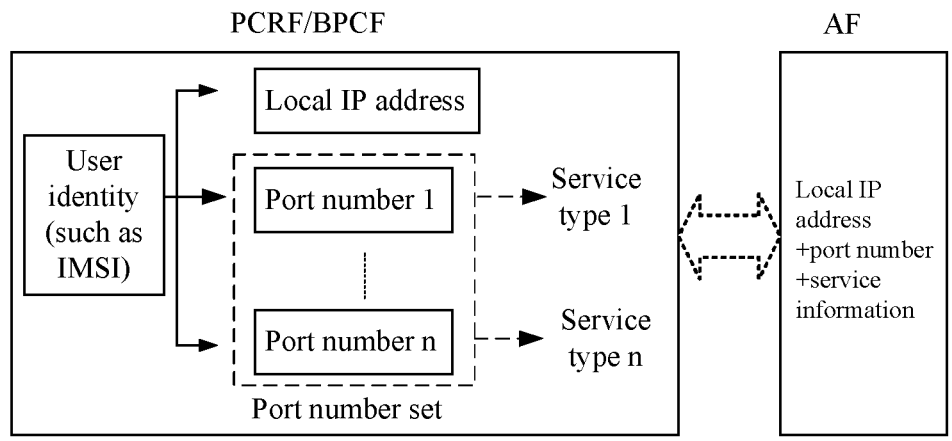
FIG. 4 is a schematic diagram of a binding mechanism of an Rx/Sd session and an S9* session according to the relevant art.
Figure 6:
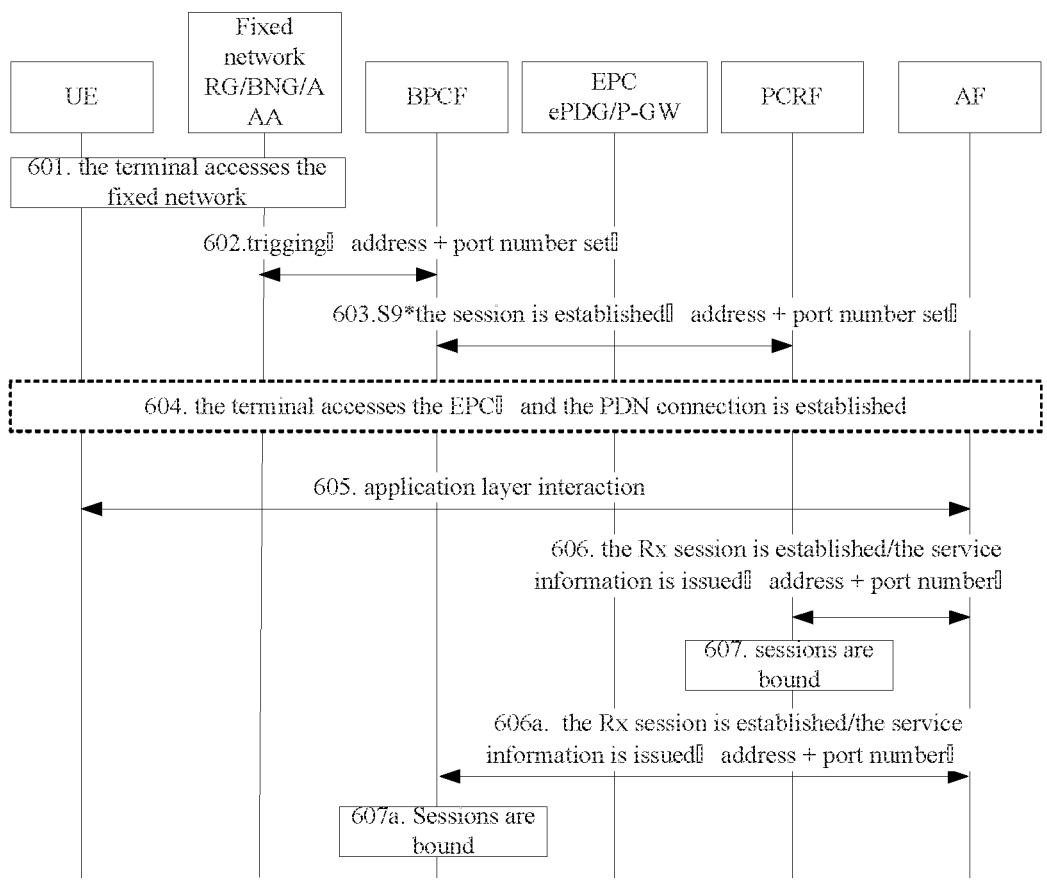
FIG. 6 is a schematic diagram of a method for session binding according to example 1 of the disclosure.

In this example, mainly described is a binding mechanism of policy sessions when initializing a terminal in a non-roaming scenario. As shown in FIG. 6, the method for session binding comprises the following steps:

step 601: the mobile terminal accesses a fixed network and performs EAP access authentication based on 3GPP, the RG of the fixed network can acquire a 3GPP mobile user identity from a 3GPP AAA server, such as IMSI or NAI. The fixed network will accomplish allocating a local IP address, the RG, BNG/BRAS, and AAA (optional) establish and transfer NA(P)T entrance table information; and finally the RG, BNG/BRAS, and AAA (optional) all have the association relationships between the user identity, and the local IP address and port number set, referred to as user identity association table for short, and the table is as shown in FIG. 4, which will not be described here.

Step 602: the BPCF acquires the user identity association table, with the user identity, local IP address and port number set contained therein, after receiving a trigger form the fixed network (BNG/BRAS or AAA).

Step 603: the BPCF selects an appropriate PCRF, and initiates an S9* session establishment operation to the PCRF. The BPCF should transfer the association table containing the user identity, local IP address and port number set to the PCRF.

Step 604: the terminal accesses the EPC to accomplish a PDN connection establishment flow. This step is optional.

Step 605: the terminal performs application layer negotiation with the AF, and the application layer negotiation is about an offload application service passing through the BNG/BRAS; that is to say, during the application layer negotiation, the address of the user is the local IP address stated in steps 602 and 603.

The offload technique in this step refers to that, data will not pass through the P-GW in the 3GPP network any more, and the P-GW will no more be responsible for sending to an external network/receiving from an external network the data, which is transmitted directly via the gateway of the fixed network; in general the BNG/BRAS sends to the external network/receives from the external network the data. This technique is also called bypass technique or network offloading technique.

The AF acquires the service information during application layer negotiation, or the TDF acquires the service information after detection.

Step 606: the AF/TDF finds an appropriate PCRF, initiates an Rx/Sd session establishment operation/issues the service information to the PCRF, and the address (i.e. local IP address) and the port number of the service is carried in the Rx/Sd session or in the service information;

step 607: the PCRF binds sessions according to the mechanism stated in the binding mechanism embodiments described above. Then the service information arrives at the PCRF via the Rx/Sd session, a policy is made by the PCRF and is issued to a fixed network policy execution unit via the S9* session and a fixed policy session.

It needs to be noted that: when the terminal initiates a service again, steps 605-607 are repeated; and steps 601-607 are repeated when other terminals access the fixed network link and access the RG.

The above-mentioned scheme is discussion made based on an S2b access scheme, and in fact the mechanism is also applicable to an S2a/2b/2c access scheme.

The above-mentioned steps of the embodiment describes a scenario where the AF/TDF finds the PCRF of the 3GPP; in fact, the AF/TDF may find the BPCF of the fixed network, then the corresponding steps which are step 606*a* and step 607*a* should be performed. Under this scenario, the AF/TDF finds the appropriate BPCF, initiates an Rx/Sd session establishment operation/issues service information to the BPCF, and the address (i.e. local IP address) and the port number of the service are carried in the Rx/Sd session; The BPCF binds sessions according to the mechanism stated in the binding mechanism embodiments described above. Then the service information arrives at the BPCF via the Rx/Sd session, and is then issued to the fixed network policy execution unit by the BPCF.

When the sessions are completely established and are successfully bound, the relevant policy is downloaded to the policy execution entity of the fixed network, generally BNG/BRAS. At this moment, the BNG/BRAS obtains a user based policy, that is to say, each user identity is corresponding to the local IP address+port number information; in this way, if a data packet flowing through the BNG/BRAS matches the local IP address+port number information, the BNG/BRAS decides that this data packet is relevant to the user identity/user. In this way, the BNG/BRAS will be able to execute the policy and search the charging information on the basis of user granular.

EXAMPLE 2

Figure 7:
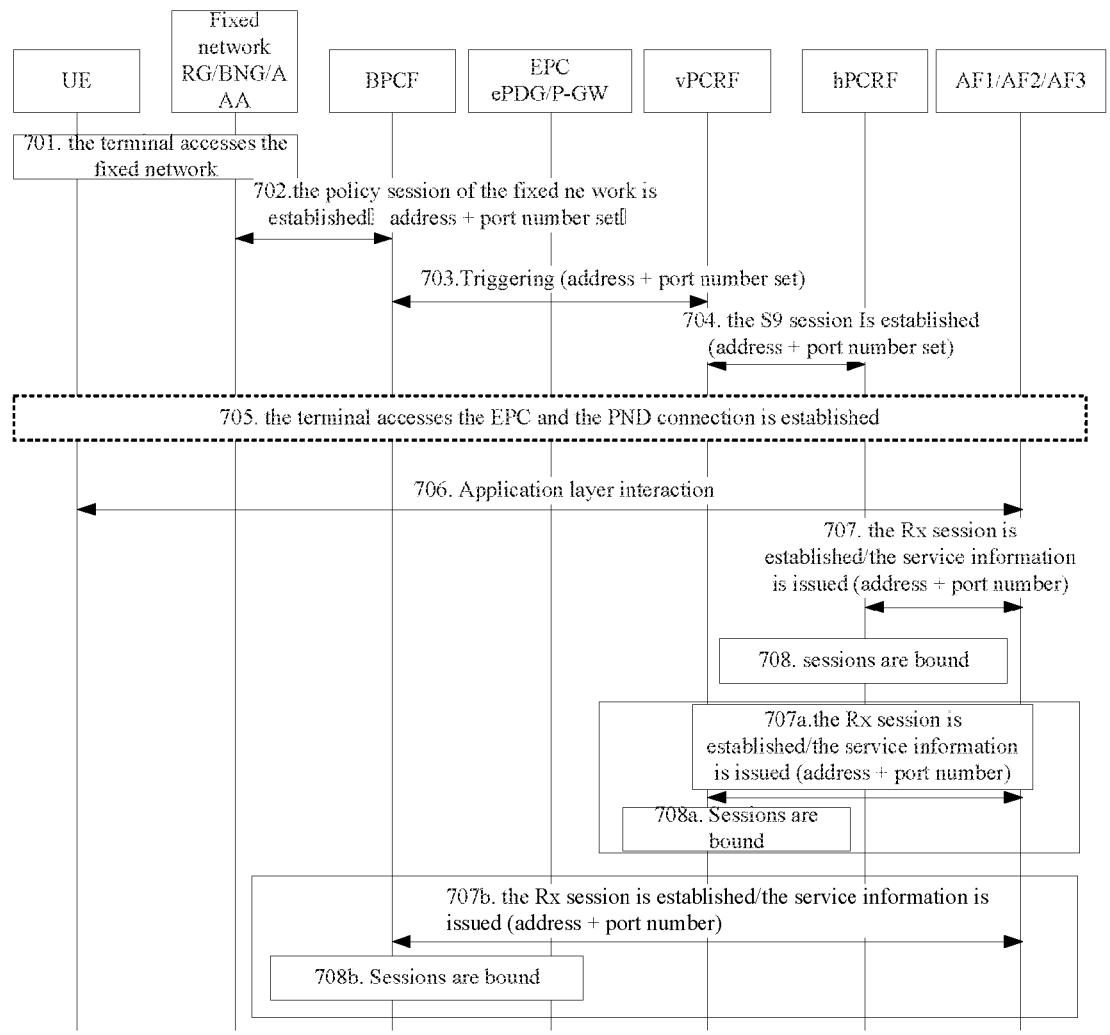
FIG. 7 is a schematic diagram of a method for session binding according to example 2 of the disclosure.

In this example, mainly described is a binding mechanism of policy sessions when initializing a terminal in a roaming scenario. As shown in FIG. 7, the method comprises the following steps:

Steps 701 and 702: the same as steps 601 and 602.

Step 703: the BPCF selects an appropriate vPCRF, with the vPCRF being a visited PCRF, and initiates an S9* session establishment operation to the vPCRF. The BPCF should transfer the association table containing the user identity, local IP address and port number set to the vPCRF.

Step 704: the vPCRF selects an appropriate hPCRF, with the hPCRF being a home PCRF, and initiates an S9* session establishment operation to the hPCRF. The vPCRF should transfer the association table containing the user identity, local IP address and port number set to the hPCRF.

Step 705: the UE accesses the EPC to accomplish a PDN connection establishment flow, and this step is an optional step.

Step 706: the terminal performs application layer negotiation with the AF. The packets of the application layer negotiation, which are passing through BNG/BRAS, are offloaded; that is to say, during the application layer negotiation, the address of the user is the local IP address stated in steps 602 and 603.

The AF acquires the service information during application layer negotiation, or the TDF acquires the service information after detection.

Step 707: the AF/TDF finds an appropriate hPCRF, initiates an Rx/Sd session establishment operation and issues the service information to the hPCRF, and the address (i.e. local IP address) and the port number of the service are carried in the Rx/Sd session; and step 708: the hPCRF binds sessions according to the binding mechanism stated in the binding mechanism embodiments described above. Then the service information arrives at the PCRF via the Rx/Sd session, a policy is made by the hPCRF and is issued to a fixed network policy execution unit via the S9 session and S9* session and a fixed policy session.

It needs to be noted that: when the terminal initiates a service again, steps 706-708 are repeated; and steps 701-708 are repeated when other terminals access the fixed network link and access the RG.

The above-mentioned step 707 and step 708 can particularly adopt step 707*a* and step 708*a*, and step 707*b* and 708*b* in FIG. 7.

The scheme in this example is discussion made based on an S2b access scheme, and in fact the mechanism is also applicable to an S2a/2b/2c access scheme.

The above-mentioned steps of the example describes a scenario where the AF/TDF finds the hPCRF of the 3GPP; in fact, the AF/TDF may find the vPCRF or BPCF of the fixed network, then the corresponding steps which are step 707*a* and step 708*a*, and step 707*b* and step 708*b* are performed. Under this scenario, the AF/TDF finds the appropriate vPCRF/BPCF, initiates an Rx/Sd session establishment operation/issues the service information to the vPCRF/BPCF, and the address (i.e. local IP address) and the port number of the service are carried in the Rx/Sd session; and the vPCRF/BPCF binds sessions according to the mechanism stated in the binding mechanism embodiments described above. Then the service information arrives at the vPCRF and BPCF via the S9 session and Rx/Sd session, and is then issued to the fixed network policy execution unit by the BPCF.

When the sessions are completely established and are successfully bound, the relevant policy is downloaded to the policy execution entity of the fixed network, generally BNG/BRAS. At this moment, the BNG/BRAS obtains a user based policy, that is to say, each user identity is corresponding to the local IP address+port number information; in this way, if a data packet flowing through the BNG/BRAS matches the local IP address+port number information, the BNG/BRAS decides that this data packet is relevant to the user identity/user. In this way, the BNG/BRAS will be able to execute the policy and search the charging information on the basis of user granular.

EXAMPLE 3

Figure 8:
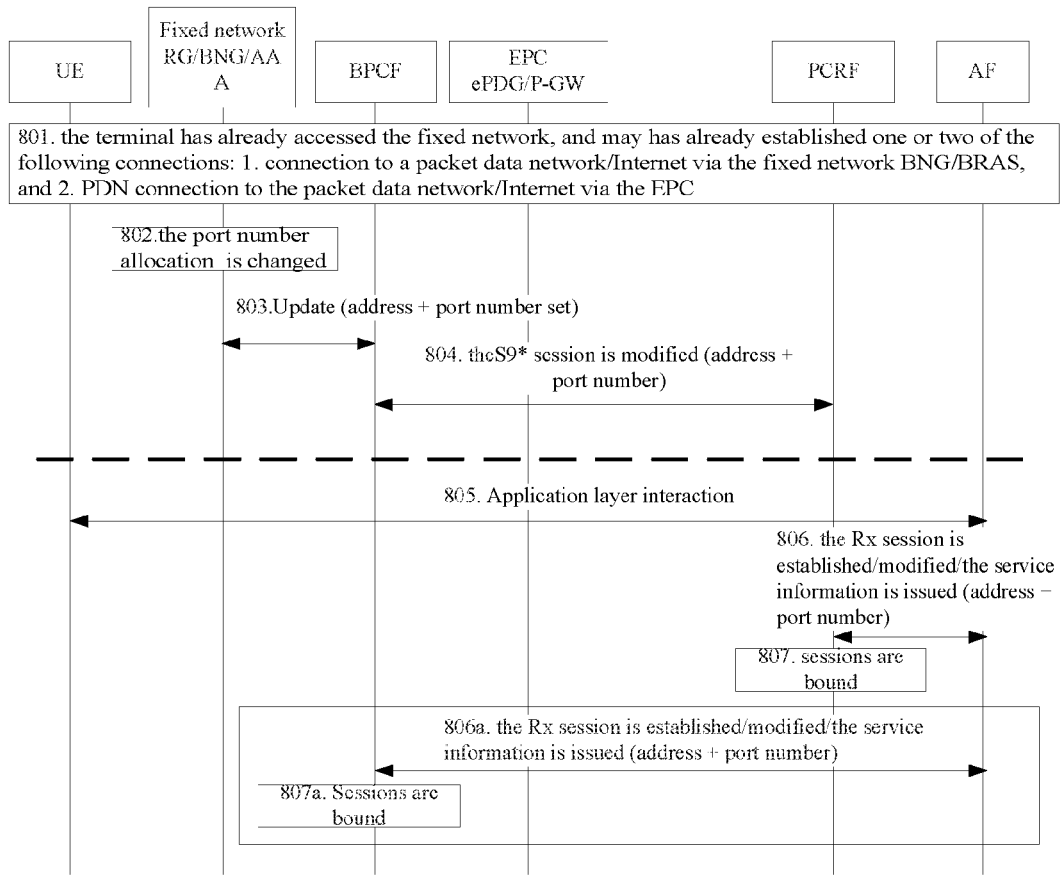
FIG. 8 is a schematic diagram of a method for session binding according to example 3 of the disclosure.

Described in this example is an operation of the RG/BNG/BRAS for updating a port number set on the policy rule entity (BPCF, v/hPCRF) when the port number set of a certain terminal user changes on the RG/BNG/BRAS, referring to FIG. 8, the updating operation comprises the following steps:

step 801: the terminal has already accessed the fixed network, and may has already established one or two of the following connections: 1. connection to a packet data network/Internet via the fixed network BNG/BRAS, and 2. PDN connection to the packet data network/Internet via the EPC.

Step 802, the port number allocation on the RG/BNG/BRAS changes. There are many reasons leading to the change of the port number allocation, for example, configuration information is changed, or the current user or another user initiates a service, and a port number is pre-empted/abdicated.

Step 803: the BNG/BRAS or AAA notify the BPCF to update the user identity association table, wherein the user identity association table contains the user identity, local IP address and port number set.

Step 804: the BPCF notify the PCRF to update the association table of the user identity and local IP address with port number via S9* session.

The update operation is completed so far. The left steps 805-807a are operations of performing session binding and policy making/issuing according to the newest user identity association table; the relevant mechanism is the same as the flow examples 1 and 2, and the relevant supplementary description is also the same as example 1 and example 2, which will not be described here.

Embodiment 2

Figure 9:
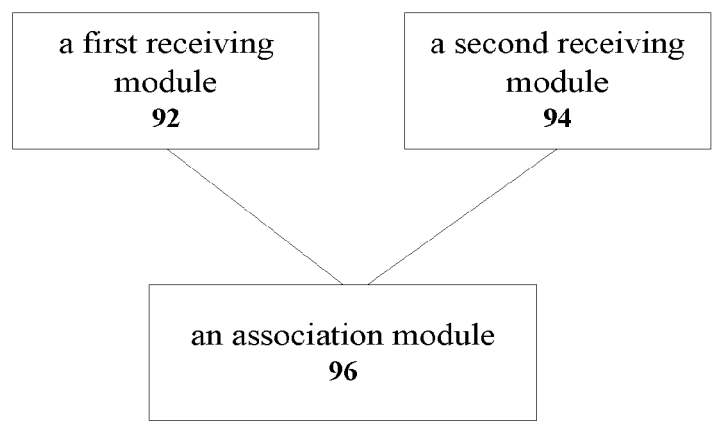
FIG. 9 is a structural block diagram of a device for session binding according to embodiment 2 of the disclosure.

A device for session binding is provided in this embodiment, the device may be set on a policy control entity (PCRF) or BPCF, referring to FIG. 9, the device comprises the following modules.

A first receiving module 92 is configured to receive a first session from a fixed network, wherein the first session carries an IP address and a port number set;

a second receiving module 94 is configured to receive a second session from an AF/TDF, wherein the second session carries an IP address and port number information; and an association module 96, connected to the first receiving module 92 and the second receiving module 94, is configured to bind the above-mentioned first session with the above-mentioned second session according to the above-mentioned IP addresses and port number information.

The association module 96 in this embodiment comprises: a judgment unit configured to judge whether the IP address carried by the first session and the IP address carried by the second session are the same, and to judge whether a port number in the port number information carried by the second session is an element in the port number set carried by the first session; and an association unit, connected to the judgment unit, configured to bind the first session and second session when the judgment results of the judgment unit are both yeses.

If the IP addresses in the above-mentioned two sessions are different, the two sessions will not be bound; and if only the IP addresses are the same, but the port number in the port number information carried by the second session is not an element in the port number set carried by the first session, the two sessions will not be bound either.

The first session in this embodiment comprises one of the following: a message for triggering an S9* session, the S9* session, an S9 session or a fixed network policy session; and the second session is an Rx/Sd session, or an AF/TDF session.

In this embodiment, sessions are bound by way of matching IP addresses and matching port numbers, the problem of inaccurate session binding in the scenario where a mobile terminal directly accesses a mobile network service via a fixed network; at the same time, the method, in which an new signalling is not added, can be able to be compatible with existing protocols, and the development cost is low and is easily realizable. This kind of method for session binding is applicable to the cases where there is neither user identity nor APN information on the Rx/Sd, which can effectively avoid error session binding when IP addresses of a plurality of terminals are the same.

The device comprises: a policy making and issuing module configured to make a policy for a service initiated by the user and issue the policy, according to the association relationship between the first session and the second session.

The above-mentioned device further comprises: a saving module configured to save the IP address and port number set of the user by means of a user identity association table. Considering that the IP address and port number allocated to the user might change, the above-mentioned device further comprises: an update module configured to receive an update session from the fixed network element, wherein the update session carries the user-changed IP address and port number set, and to update the IP address and port number set in the user identify association table of the user using the user-changed IP address and port number set.

The above-mentioned first session can be a first session initiated in one of the following scenarios:

1) when a terminal initially accesses the fixed network, the fixed network initiates a first session establishment process, with the first session carrying the IP address and port number set initially allocated to the terminal by the fixed network; and 2) when updating the IP address and/or port number set of the terminal, the fixed network initiates a first session modification process, with the first session carrying the modified IP address and/or port number set.

A system for session binding is also provided in this embodiment, the system comprises a PCRF or BPCF; and the above-mentioned device for session binding is provided on the PCRF or BPCF, and the system further comprises: a fixed network element configured to send the first session to the device, and an Application Function (AF)/TDF configured to send the second session to the device.

The fixed network element comprises one of the following: an RG, a BNG, a BRAS, or an AAA server.

In this embodiment, whether sessions are bound, i.e., whether the sessions are initiated by the same user, is determined according to the IP address and port number (set) carried in the sessions; and the accuracy of session binding is improved, the problem of inaccurate session binding in the scenario where a mobile terminal directly accesses a mobile network service via a fixed network; at the same time, the method does not add a new signalling, being able to be compatible with existing protocols, and the development cost is low and is easily realizable. This kind of method for session binding is applicable to the cases where there is neither user identity nor APN information on the Rx/Sd, which can effectively avoid error of session binding when an IP address of a plurality of terminals are the same.

It can be seen from the above-mentioned description that whether sessions are bound is determined by means of the IP address combined with the port number in the above-mentioned embodiment; error session binding when IP addresses of a plurality of terminals are the same is effectively avoided, and no new signalling is added, which is easily realizable.

Obviously, those skilled in the art should know that each of the mentioned modules or steps of the disclosure can be realized by universal computing devices; the modules or steps can be focused on single computing device, or distributed on the network formed by multiple computing devices;

selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for session binding, comprising:
   a Policy and Charging Rules Function (PCRF) or a Broadband Policy Control Function (BPCF) receiving a first session from a fixed network, wherein the first session carries an IP address and a port number set;
   the PCRF or BPCF receiving a second session from an Application Function (AF) or a Traffic Detection Function (TDF), wherein the second session carries an IP address and port number information; and
   the PCRF or BPCF binding the first session to the second session according to the IP addresses and the port number information;
   wherein after the PCRF or BPCF binding the first session to the second session, the method further comprises: the PCRF or BPCF making a policy for a service according to an association relationship between the first session and the second session, and issuing the policy.

2. The method according to claim 1, wherein
   the first session comprises one of the following: a message for triggering an S9* session, an S9* session, an S9 session or a fixed network policy session; and
   the second session is embodied as an Rx session, or an AF session, or an Sd session, or a TDF session.

3. The method according to claim 1, wherein the PCRF or the BPCF binding the first session to the second session according to the IP addresses and the port number information comprises:
   the PCRF or BPCF binding the first session to the second session when determining that the first session and the second session satisfy the following two conditions:
   1) the IP address of the first session and the IP address of the second session are the same; and
   2) a port number in the port number information of the second session is an element in the port number set of the first session.

4. The method according to claim 1, wherein the method further comprises: the PCRF or BPCF saving the IP address and the port number set by means of a user identity association table.

5. The method according to claim 1, wherein the PCRF or BPCF receiving the first session from the fixed network comprises one of the following:
   when a terminal starts an initial access to the fixed network, the fixed network initiating a first session establishment process, with the first session carrying the IP address and port number set initially allocated to the terminal by the fixed network; and
   when updating the IP address and/or port number set of the terminal, the fixed network initiating a first session modification process, with the first session carrying the modified IP address and/or port number set.

6. A device for session binding, wherein the device is provided on a Policy and Charging Rules Function (PCRF) or Broadband Policy Control Function (BPCF), and the device comprises:
   a first receiving module configured to receive a first session from a fixed network, wherein the first session carries an IP address and a port number set;
   a second receiving module configured to receive a second session from an Application Function (AF) or a Traffic Detection Function (TDF), wherein the second session carries an IP address and port number information; and
   an association module configured to bind the first session to the second session according to the IP addresses and port number information;
   wherein, the device is further configured to make a policy for a service according to an association relationship between the first session and the second session, and issue the policy after binding the first session to the second session.

7. The device according to claim 6, wherein the association module comprises:
   a judgment unit configured to judge whether the IP address carried by the first session and the IP address carried by the second session are the same, and to judge whether a port number in the port number information carried by the second session is an element in the port number set carried by the first session; and
   an association unit configured to bind the first session to the second session when judgment results of the judgment unit are the IP address carried by the first session and the IP address carried by the second session are the same and the port number in the port number information carried by the second session is the element in the port number set carried by the first session.

8. A system for session binding, comprising:
   a Policy and Charging Rules Function (PCRF) or Broadband Policy Control Function (BPCF),
   a device for session binding provided on the PCRF or BPCF, the device comprising:
   a first receiving module configured to receive a first session from a fixed network, wherein the first session carries an IP address and a port number set;
   a second receiving module configured to receive a second session from an Application Function (AF) or a Traffic Detection Function (TDF), wherein the second session carries an IP address and port number information; and
   an association module configured to bind the first session to the second session according to the IP addresses and port number information;
   wherein, the device is further configured to make a policy for a service according to an association relationship between the first session and the second session, and issue the policy after binding the first session to the second session;
   the system further comprising:
   a fixed network element configured to send the first session to the device; and wherein
   the AF or the TDF is configured to send the second session to the device.

9. The system according to claim 8, wherein the fixed network element comprises one of the following: a Residential Gateway (RG), a Broadband Network Gateway (BNG), a Broadband Remote Access Server (BRAS), or an Authentication, Authorization and Accounting (AAA) server.

10. The system according to claim 8,
wherein the association module comprises:
   a judgment unit configured to judge whether the IP address carried by the first session and the IP address carried by the second session are the same, and to judge whether a port number in the port number information carried by the second session is an element in the port number set carried by the first session; and
   an association unit configured to bind the first session to the second session when judgment results of the judgment unit are the IP address carried by the first session and the IP address carried by the second session are the same and the port number in the port number information carried by the second session is the element in the port number set carried by the first session.

11. The system according to claim 10, wherein the fixed network element comprises one of the following: a Residential Gateway (RG), a Broadband Network Gateway (BNG), a Broadband Remote Access Server (BRAS), or an Authentication, Authorization and Accounting (AAA) server.

* * * * *